(12) United States Patent
Redinbo

(10) Patent No.: US 7,893,570 B2
(45) Date of Patent: Feb. 22, 2011

(54) CLEAN ENGINE

(76) Inventor: Richard Redinbo, 4625 St. Rd 25 N., Lafayette, IN (US) 47905

( * ) Notice: Subject to any disclaimer, the term of this patent is extended or adjusted under 35 U.S.C. 154(b) by 626 days.

(21) Appl. No.: 11/818,348

(22) Filed: Jun. 14, 2007

(65) Prior Publication Data

US 2008/0309205 A1    Dec. 18, 2008

(51) Int. Cl.
H02K 21/00 (2006.01)
(52) U.S. Cl. ......................... 310/24; 310/152
(58) Field of Classification Search ............... 310/23, 310/24, 152, 156.08, 32, 38, 43
See application file for complete search history.

(56) References Cited

U.S. PATENT DOCUMENTS

| | | | |
|---|---|---|---|
| 788,291 A * | 4/1905 | Titzel, Sr. .................... 310/46 |
| 2,399,575 A | 4/1946 | Schleicher | |
| 2,859,302 A | 11/1958 | Schleicher | |
| 4,025,807 A | 5/1977 | Clover | |
| 4,086,505 A | 4/1978 | McDonald | |
| 4,450,373 A * | 5/1984 | Miller et al. ................... 310/51 |
| 4,758,769 A | 7/1988 | Carrigan | |
| 5,233,251 A * | 8/1993 | Nehmer ..................... 310/167 |
| 5,258,697 A | 11/1993 | Ford | |
| 5,428,282 A | 6/1995 | Johnson | |
| 5,457,349 A * | 10/1995 | Gifford ......................... 310/24 |
| 5,514,923 A | 5/1996 | Gossler | |
| 5,996,209 A * | 12/1999 | Molnar et al. ................. 29/596 |
| 6,392,370 B1 | 5/2002 | Bedini | |
| 6,552,460 B2 | 4/2003 | Bales | |
| 6,606,578 B1 | 8/2003 | Henderson | |
| 6,812,663 B2 | 11/2004 | Kramer | |
| 6,849,984 B2 | 2/2005 | Gallant | |
| 6,930,433 B2 | 8/2005 | Bales | |
| 7,105,972 B2 | 9/2006 | Gallant | |
| 7,205,695 B2 | 4/2007 | Smith | |
| 2001/0030473 A1 | 10/2001 | Martin | |
| 2005/0073281 A1 | 4/2005 | Kerlin | |
| 2005/0127767 A1* | 6/2005 | Gallant ......................... 310/113 |
| 2005/0184613 A1* | 8/2005 | Minato et al. ............... 310/178 |
| 2006/0152009 A1 | 7/2006 | Wilt | |

* cited by examiner

Primary Examiner—Quyen Leung
Assistant Examiner—Naishadh N Desai
(74) Attorney, Agent, or Firm—Dowell Baker, P.C.

(57) ABSTRACT

A clean engine for transportation, generators, and other applications. It comprises a series of alternating support wheel assemblies and magnet wheel assemblies that are propelled in a consistent pattern by battery powered electromagnets. The engine comprises at least one support wheel assembly and at least one magnet wheel assembly. The support wheel assemblies and magnet wheel assemblies are aligned in a specific pattern along a main shaft that is supported on each end by sealed bearings mounted in a nonmagnetic housing.

17 Claims, 18 Drawing Sheets

FIG. 14C
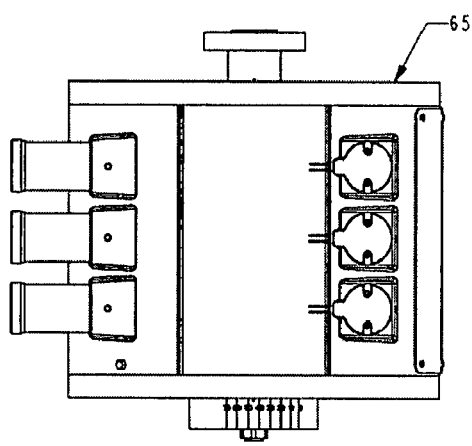
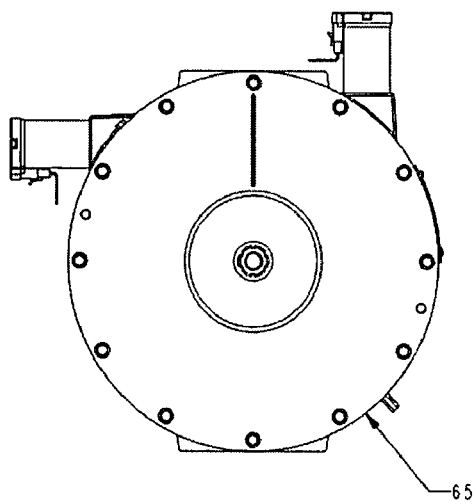
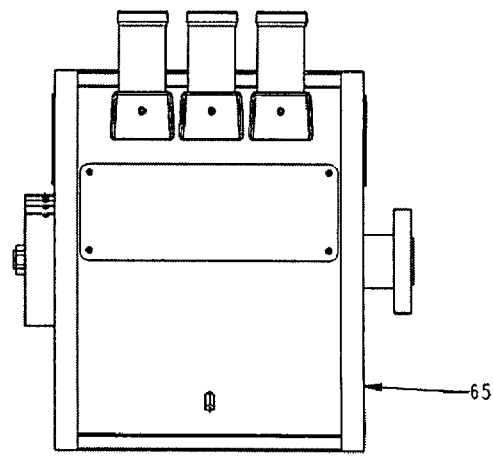
FIG. 14A  FIG. 14B

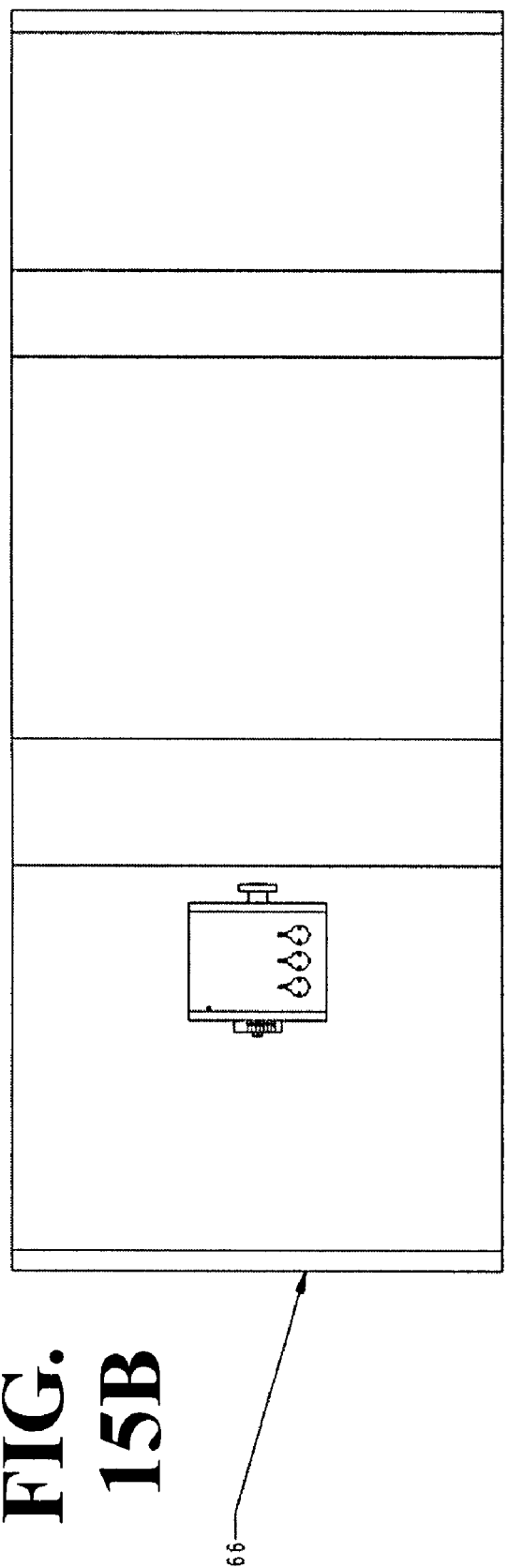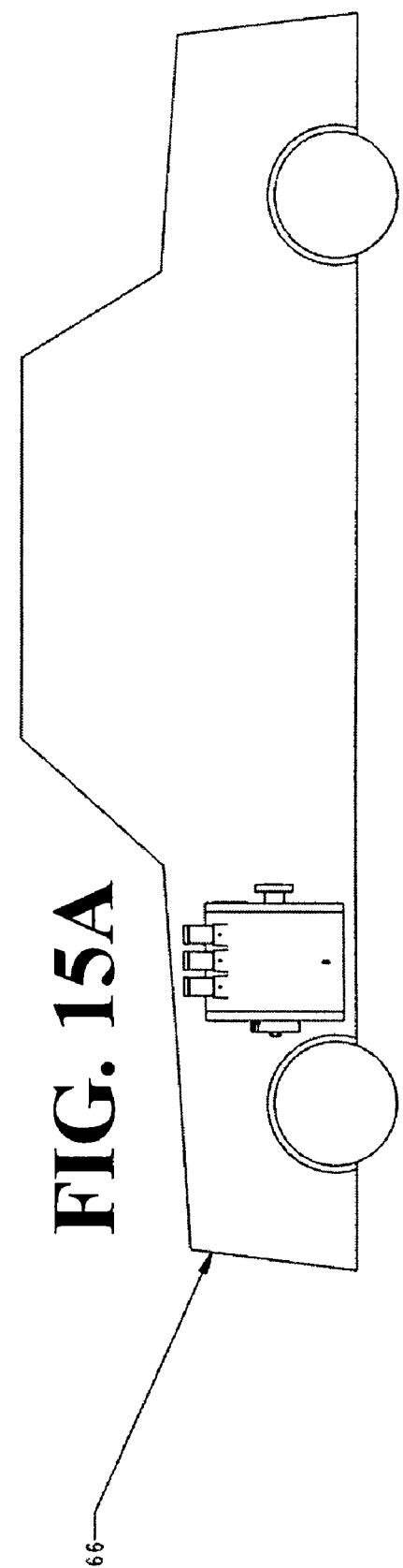
FIG. 15B
FIG. 15A

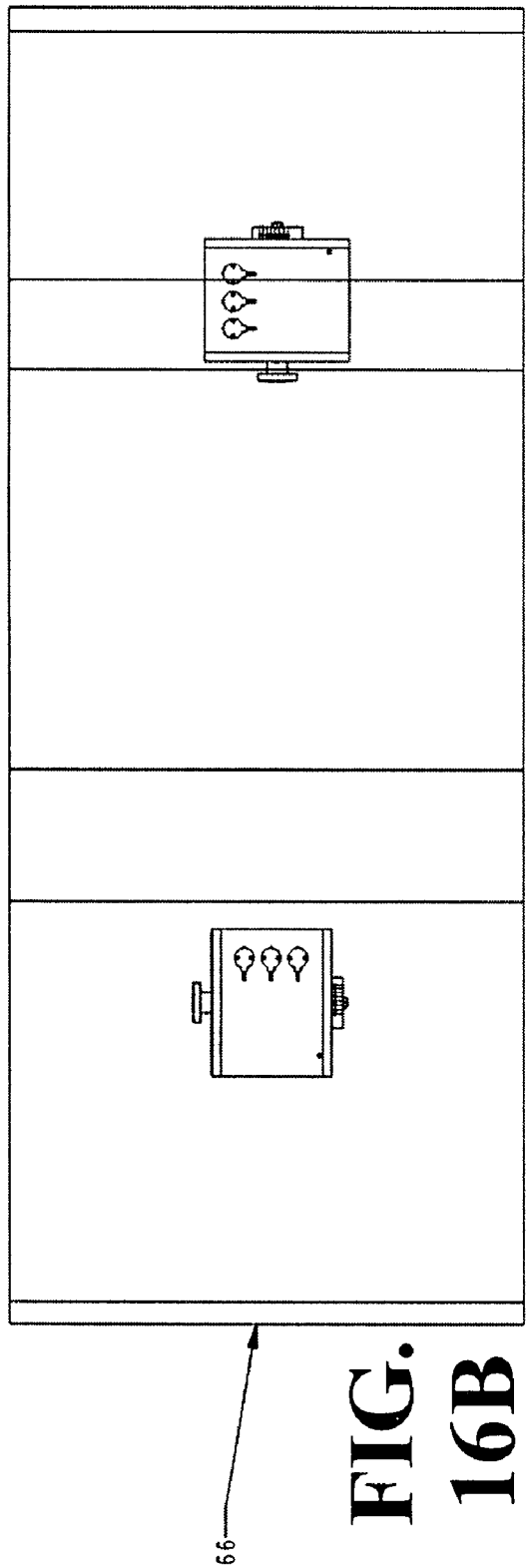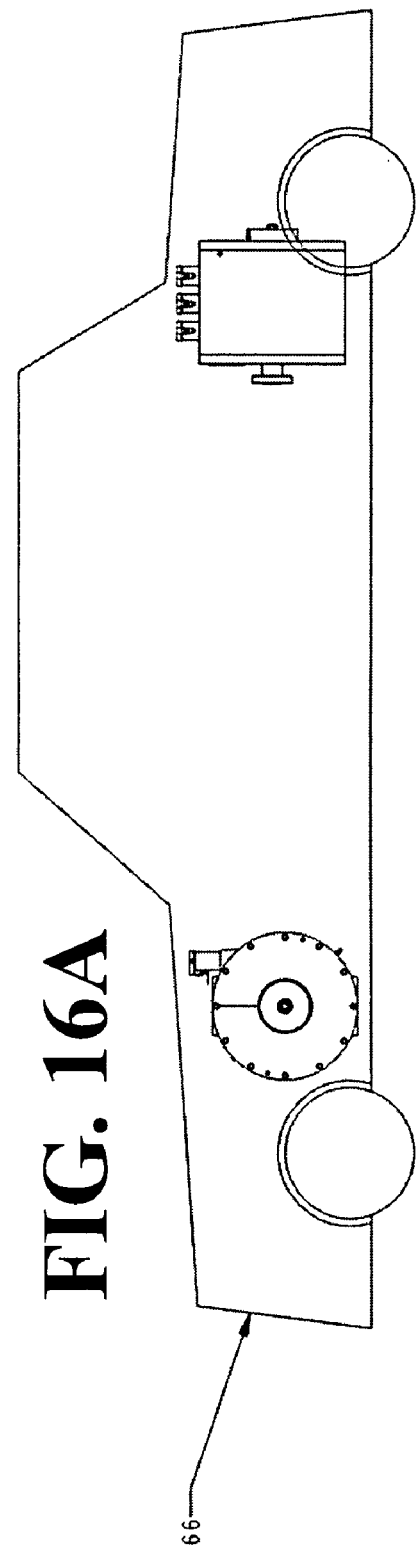

90

91

92

CLEAN ENGINE

FIELD OF INVENTION

This invention relates to engines, more specifically, it relates to a clean engine capable of producing high levels of torque. Clean engine is defined to mean an engine that produces substantially no carbon emissions.

BACKGROUND OF THE INVENTION

Many kinds of engines exist that can be used to produce work. Internal combustion engines are relatively small and lightweight for the amount of power they can produce and are commonly used in applications where weight and space are limited, such as in an automobile. External heat engines are capable of achieving a higher level of efficiency than internal combustion engines, however external heat engines are large and heavy. Electric engines are often used in situations where pollution and engine noise are of concern.

Several problems exist with electric engines. One problem is that is that the power to weight ratio of electrochemical batteries is not as high as petroleum based fuels. Therefore, electric engines used in automobiles must be more efficient than internal combustion engines to compensate for the lower power density of the fuel. Thus it is desirable to have a highly efficient electric engine.

Another problem is that engines are often complex machines. Building and repairing complex machines requires more training and time than for simple machines. Thus it is desirable to have a clean engine that is simple in design.

Another problem is that engines wear out with time and need regular internal servicing. Therefore, it is desirable to have a clean engine that includes components that are easily repaired and replaced.

Another problem with rotary engines is that turbulent airflow can occur within the engine. Turbulent airflow can create drag within the engine and reduce the total efficiency of the engine. Thus, it is desirable to have an engine that contains features designed to reduce turbulent airflow.

Another problem with engines is that the timing of the application of force to drive the engine can be complex. This increased complexity may increase the likelihood of mechanical failure. Thus, it is desirable to have a simple mechanism for timing the application of force to the engine.

There have been many attempts to solve some of these problems. For example, U.S. Pat. No. 788,291 titled "Dynamo or Motor" issued to Titzel discloses a "dynamo or motor, comprising a revolvable cylindrical armature provided with magnets and with sector-shaped contacts, each contact being connected with a magnet, consecutive contacts being connected with magnets not consecutive but arranged in a definite order, normally stationary field magnets disposed radially from said armature and spaced apart, brushes for supplying the currents to said sector shaped contacts, and a means controllable at will for shifting the position of said armature-magnets, for the purpose of reversing the direction of rotation of the armature."

U.S. Pat. No. 4,025,807 titled "Electromagnetic Motor" issued to Clover discloses "an electromagnetic motor including a rotor having a plurality of permanent magnets on its periphery and a stator closely encompassing the rotor and having a plurality of intervening permanent magnets and electromagnets positioned for interaction with the rotor magnets, the electromagnets being cyclically energized to exert forces on the rotor to effect advance thereof in a predetermined direction."

U.S. Pat. No. 5,428,282 titled "Release-type permanent magnet motor" issued to Johnson discloses "an electric motor that includes a rotor with permanent magnets and a stator with electromagnets, of the 'release' type wherein current to a 'last' electromagnet that a permanent magnet is moving away from, receives only enough current to 'release' the permanent magnet from the electromagnet core, with the permanent magnet attracted to the core of the 'next' electromagnet whose coil does not carry current. The amount of current to the 'last' electromagnet varies with the angular distance of the permanent magnet moving away from the 'last' electromagnet. The electromagnets and permanent magnets can be in a ratio of 3 to 2. The percent of total electromagnets which are energized during each complete rotation of the rotor can be reduced to save electricity when only a small output torque is required."

U.S. Pat. No. 6,392,370 titled "Device and method of a back EMF permanent electromagnetic motor generator" issued to Bedini discloses "a back EMF [Electromagnetic Force] permanent electromagnetic motor generator and method using a regauging process for capturing available electromagnetic energy in the system. The device is comprised of a rotor with magnets of the same polarity; a timing wheel in apposition to a magnetic Hall Effect pickup switch semiconductor; and a stator comprised of two bars connected by a permanent magnet with magnetized pole pieces at one end of each bar. There are input and output coils created by wrapping each bar with a conducting material such as copper wire. Energy from the output coils is transferred to a recovery rectifier or diode. The magnets of the rotor, which is located on a shaft along with the timing wheel, are in apposition to the magnetized pole pieces of the two bars. The invention works through a process of regauging, that is, the flux fields created by the coils is collapsed because of a reversal of the magnetic field in the magnetized pole pieces thus allowing the capture of available back EMP [Electromagnetic Pulse] energy. Additional available energy may be captured and used to re-energize the battery, and/or sent in another direction to be used as work. As an alternative, the available back EMF energy may be dissipated into the system."

U.S. Pat. No. 2,399,575 titled "Electromagnetic Switch" issued to Schliecher discloses an "electromagnet structure . . . [with] quickly detachable electromagnet parts; for slidably mounting the electromagnet field piece [, and] for slotting the armature track to facilitate assembly of the electromagnet."

U.S. Pat. No. 5,233,251 issued an "electric motor with non-radial magnetic drive system" issued to Nehmer discloses "a D.C. motor [that] includes a rotor and a stator with chordally oriented electromagnetic units, with windings pulse energized to establish a rotary force on the rotor as a result of the non-radial orientation of the driving forces. Each electromagnetic unit including a pole is extended along a substantially chordal line of the motor. All rotor poles are connected to a shaft by a radial crank arm and may be integrally or separately formed. A sensor detects pole alignment to then pulse the windings, and generate opposing magnetic forces to rotate the rotor. The winding establish opposite polarity at the adjacent pole ends of aligned poles to drive the rotor. A D.C. motor connected to the rotor, or special internal poles may be provided to align the poles for starting the motor. A plurality of the motors mounted to a common shaft with the electromagnetic units in the adjacent motors offset from each other and sequentially pulsed to establish continuous rotation. A multiple section motor assembly provides a stepping motor with small individual steps. Various rotor and stator constructions with crank-like rotor pole units are disclosed."

U.S. Pat. No. 6,552,460 titled "Brushless electromechanical machine" issued to Bales discloses "an electromotive machine having a stator element and a rotor element, the stator element including at least one set of four toroidally shaped electromagnetic members, the electromagnetic members arranged along an arc a predetermined distance apart defining a stator arc length. Each of the members has a slot, and the rotor element includes a disc adapted to pass through the slots. The disc contains a plurality of permanent magnet members spaced side by side about a periphery thereof and arranged so as to have alternating north-south polarities. These permanent magnet members are sized and spaced such that within the stator arc length the ratio of stator members to permanent magnet members is about four to six. The electromagnetic members are energized in a four phase push-pull fashion to create high torque and smooth operation."

U.S. Pat. No. 6,930,433 titled "Brushless electro-mechanical machine" issued to Bales discloses "an electromotive machine having a stator element and a rotor element, the stator element including at least one set of N preferably toroidally shaped electromagnetic members, the electromagnetic members arranged along an arc a predetermined distance apart defining a stator arc length. Each of the members has a slot, and the rotor element includes a disc adapted to pass through the slots. The disc contains a plurality of permanent magnet members spaced side by side about a periphery thereof and arranged so as to have alternating north-south polarities. These permanent magnet members are sized and spaced such that within the stator arc length the ratio of stator members to permanent magnet members is N to N+1, where N is the number of electrical excitation phases applied to the electromagnets. The electromagnetic members are energized to create high torque and smooth operation."

However, none of these solutions solve all of the problems associated with electric engines. Thus, it is desirable to provide an easily maintainable efficient electric engine capable of generating high levels of torque. It is also desirable to have removable electromagnets on the electric engine so that the engine can easily be repaired. It is also desirable to have components in the engine that reduce turbulent airflow within the engine.

SUMMARY OF THE INVENTION

In accordance with preferred embodiments of the present invention, some of the problems associated with electric engines are overcome. A clean engine is presented.

Disclosed is an invention for a clean engine for transportation, generators, and other applications. It comprises a series of alternating support wheel assemblies and magnet wheel assemblies that are propelled in a consistent pattern by battery powered electromagnets. The engine comprises at least one support wheel assembly and at least one magnet wheel assembly. The support wheel assemblies and magnet wheel assemblies are aligned in a specific pattern along a main shaft that is supported on each end by sealed bearings mounted in a nonmagnetic housing.

Each magnet wheel comprises a plurality of permanent magnets spaced evenly around the circumference of the wheel. At one position in the rotation of the wheels, the axis of the permanent and electromagnets are aligned such that the north poles oppose each other. When the electromagnet is then energized, an opposing force is created that turns the magnet wheel. If more than one magnet wheel is utilized, each successive wheel is rotated 20 degrees relative to the adjacent ones such that only one electromagnet fires at any given moment in time. This spacing is also critical for electromagnet assembly.

The electromagnet uses the field of the passing permanent magnet as a trigger for firing its own field. It utilizes a positive-negative-positive (pnp) and/or a negative-positive-negative (npn) metal-oxide-semiconductor field-effect transistor (MOSFET) as part of an electrical circuit to deliver energy to its magnetic wire coil.

The foregoing and other features and advantages of preferred embodiments of the present invention will be more readily apparent from the following detailed description. The detailed description proceeds with references to the accompanying drawings.

BRIEF DESCRIPTION OF THE DRAWINGS

Preferred embodiments of the present invention are described with reference to the following drawings, wherein:

FIGS. 14 A, B, and C are block diagrams illustrating a 6-electromagnet engine design;

FIGS. 15 A, 15 B, 16A, and 16B are block diagrams illustrating a clean electromagnetic engine in a vehicle;

DETAILED DESCRIPTION OF THE INVENTION

Disclosed is a clean engine comprising an electromagnet, a support wheel, and magnet wheel. Permanent magnets are disposed about the circumference of the magnet wheel. The support wheel provides structural support to the magnet wheel. When an electromagnet in close proximity to the magnet wheel is energized, a magnetic force exerts a force on a permanent magnet causing a rotation of the support and magnet wheels. The clean engine may include features for easily replacing the electromagnet, controlling airflow within the engine, and a device for timing the energization of the electromagnet.

Figure 1:
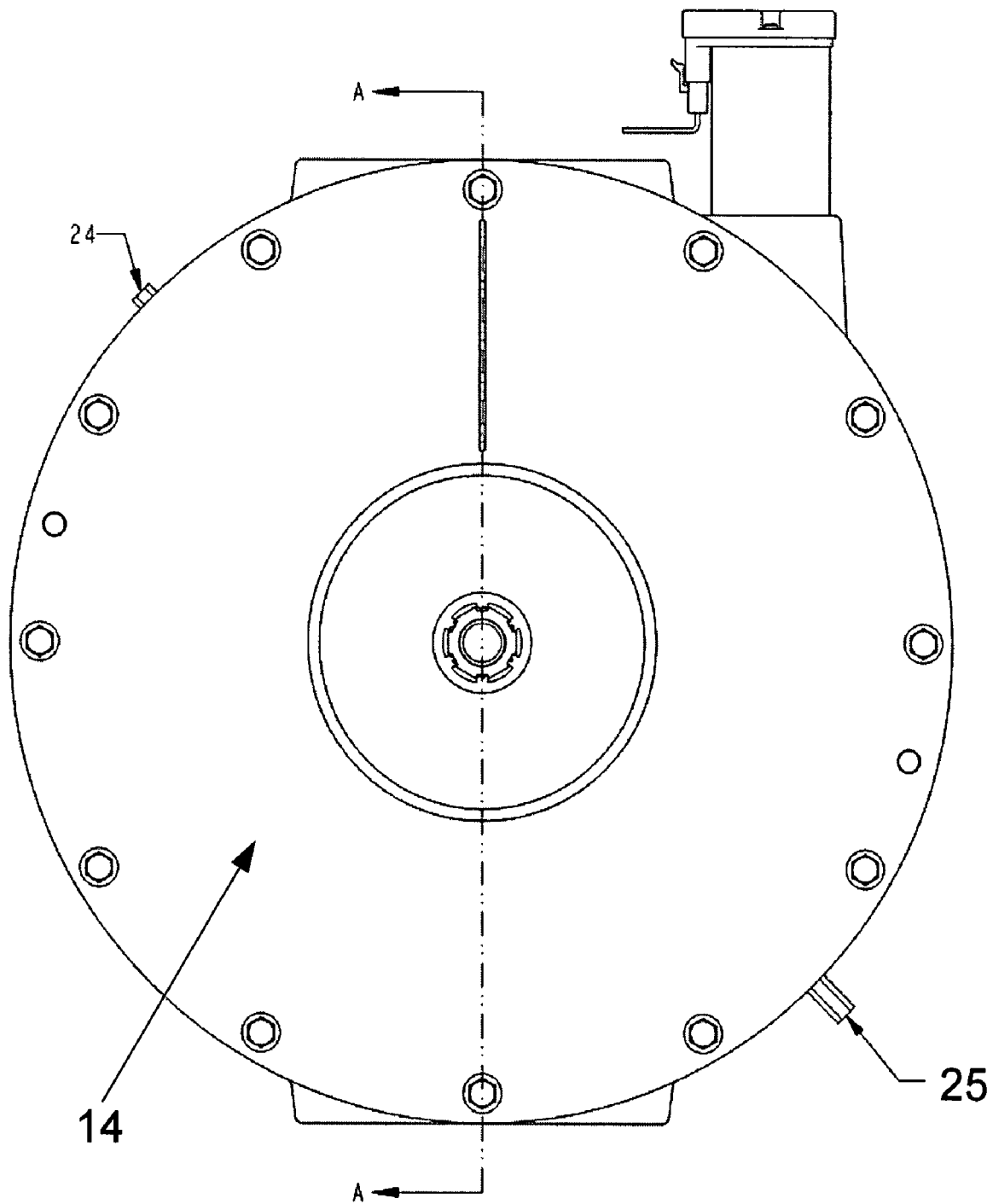
FIG. 1 is a block diagram illustrating a front view of a clean electromagnetic engine.

Referring to FIG. 1, the clean engine has an electromagnet assembly 22 connected to a main housing 14. The clean engine also has a vent 25 located in the main housing 14.

Figure 2:
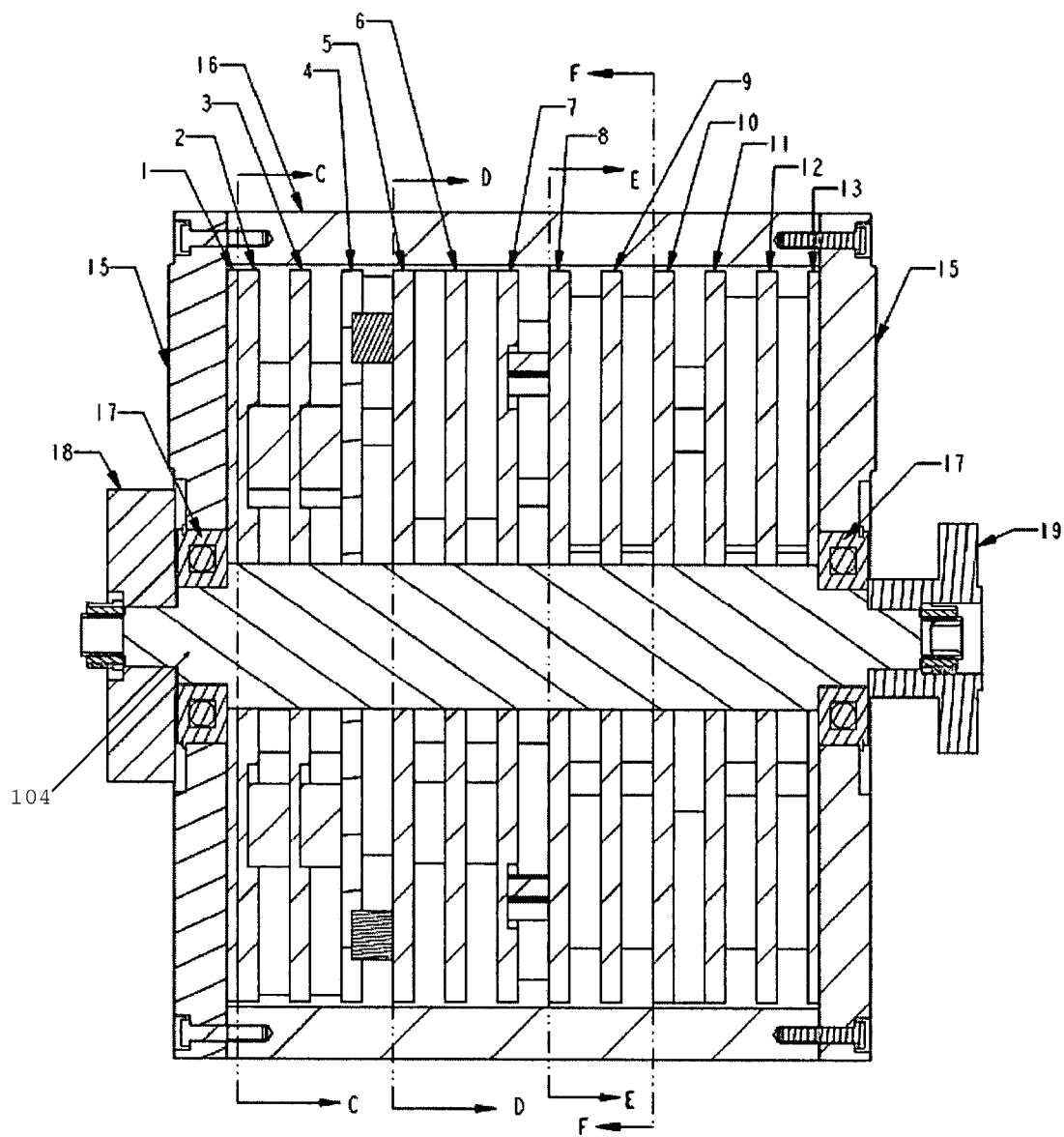
FIG. 2 is a block diagram illustrating a sectional view along A-A of FIG. 1.

Referring to FIG. 2, the engine comprises a non-rotating stator section, and a rotating element within the main housing 14. The main housing includes a cylinder section 101 and two end units (102 and 103).

The rotating element 104 of the engine comprises locking wheels 1 and 13 that control the rotational position of the shaft during assembly. Nonmagnetic wheel assemblies 2 and 3 support the first magnet wheel assembly 4. Nonmagnetic wheel assemblies 5 and 6 support the second magnet wheel assembly 7. Nonmagnetic wheel assemblies 8 and 9 support the third magnet wheel assembly 10. Additional nonmagnetic wheel assemblies 11 and 12 are connected to a main shaft 16 that rotates about an axis of rotation. All the wheels are connected to, and aligned along the main shaft 16.

Each magnet wheel assembly 4, 7, 10 comprises a first set plurality of permanent magnets spaced evenly around the circumference of the wheel assembly. The magnetic poles of the magnets in the first set of magnets are aligned so that the same pole is attached to the outer circumference of the wheel assembly. In one exemplary embodiment, the permanent magnets are made of Neodymium, Alnico, or other rare earth metals. Alnico is an acronym for alloys which are composed primarily of aluminum, nickel and cobalt, with the possible addition of iron, copper, titanium, and other materials.

At one position in the rotation of the wheels assemblies, the axis of the permanent and electromagnets are aligned such that the north poles oppose each other and when the electromagnet is energized, this creates an opposing force that turns the magnet wheel. If more than one magnet wheel is utilized, each successive wheel is rotated relative to the adjacent ones such that only one electromagnet fires at any given moment in time. When the axis of the permanent magnet and electromagnet are aligned, a small substantially constant gap of less than 5 cm and more preferably less than 1 mm will exist between the permanent and electromagnet.

The main shaft 16 is supported at each end by a sealed bearing 17. The sealed bearings 17 are located in a machined pocket in the end plates 15. End plates 15 support the main shaft 16 concentrically relative to a main housing 14. The main housing 14 is made from nonmagnetic materials. A degree wheel 18 indicates the rotational position of the main shaft 16, rotational position of the magnet wheel assemblies 4, 7, 10, and the nonmagnetic wheel assemblies 2, 3, 5, 6, 8, 9, 11, and 12. The degree wheel 18 may also be used to serve a balancing and vibration dampening functions for the clean engine. The degree wheel may have a plurality of marks on it indicate the rotational position of rotor assembly. Hubs 19 may be used to attach flywheels, transmissions or other equipment (not shown) that require torque and power.

In one exemplary embodiment, the support wheel assemblies comprise nonmagnetic parts made from cast, machined, and/or molded components that are mated together with high strength aerospace grade epoxy. The magnet wheels also comprise a cast, machined, and/or molded base along with a series of 6 permanent magnets attached with high strength aerospace grade epoxy. As wheels are assembled along the main shaft, they are attached to one another with high strength epoxy. The wheels are also attached to the main shaft with high strength epoxy.

In another exemplary embodiment, all metallic materials will be protected with corrosion resistant coating, plating, painting, or anodizing. The clean engine will require no oil or water cooling system.

Figure 3:
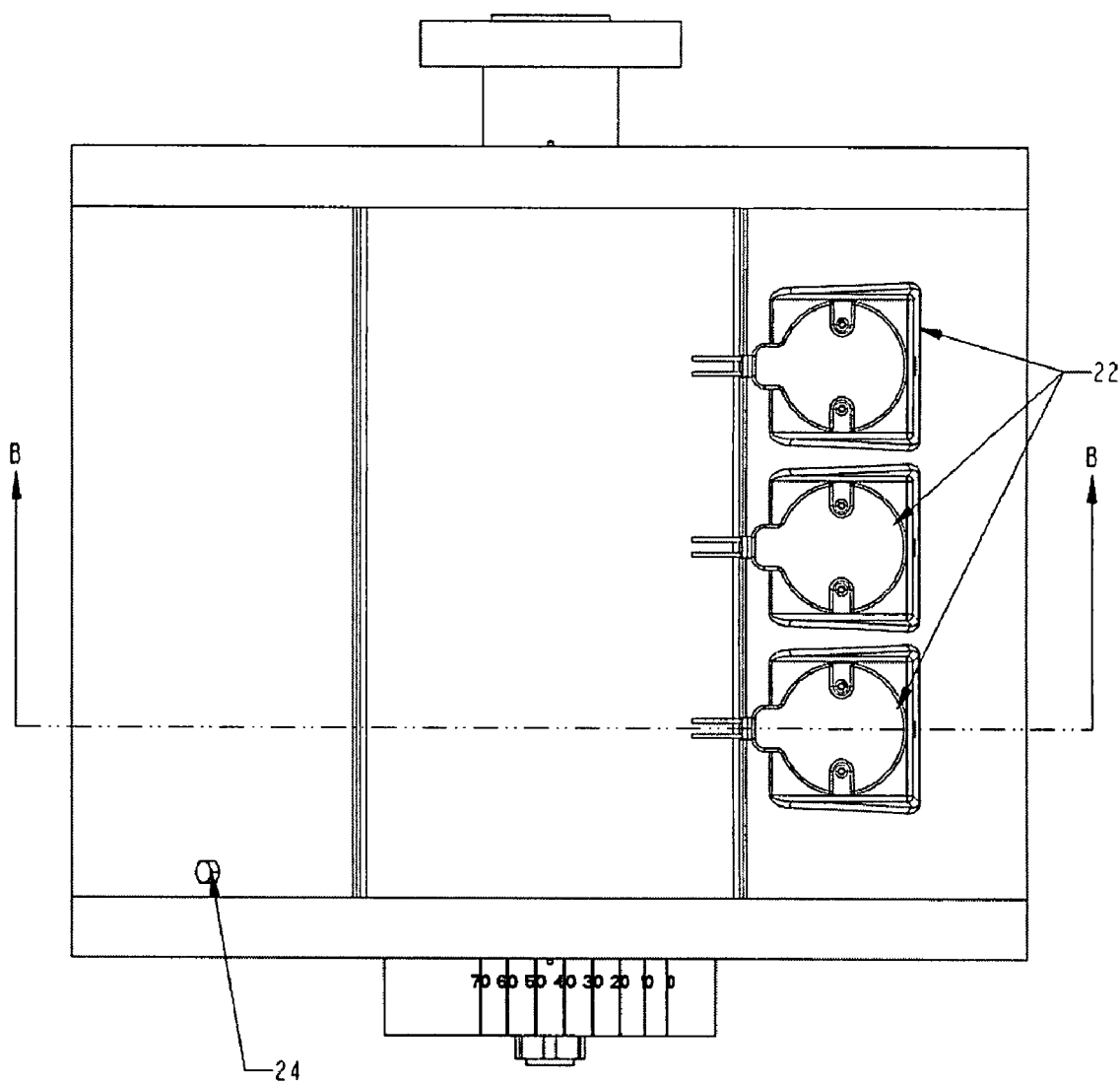
FIG. 3 is a block diagram illustrating a longitudinal top view of a clean electromagnetic engine.

Referring to FIG. 3, a top view of a clean engine is shown. The spacing of three electromagnet assemblies 22 is shown. The invention is not limited to three electromagnet assemblies 22. It will be readily apparent to those skilled in the art to utilize more or fewer electromagnet assemblies 22, and wheel assemblies 1-13 based on the desired characteristics of the clean engine.

One exemplary embodiment of the invention that is self starting under no load and has smooth power flow will comprise three or more electromagnets. In another embodiment of the invention, banks of electromagnet assemblies are located at certain intervals around the outside of the main housing. Theoretically, the number of electromagnets is only limited by the number of permanent magnets used on the magnet wheel assemblies.

The clean engine of FIG. 3 also shows the location of a plug 24 that allows access to a hole in the housing when removed. The hole will be used to align the notches 26 (see FIG. 6) in the locking wheel 1 and the support wheel assembly 2 at a certain angle on the degree wheel 18. A locking pin can be inserted in this hole so that electromagnets can easily be installed or removed from the clean engine. Another feature that facilitates the repair of the clean engine is a means for facilitating the removal of the electromagnet assemblies 22. Means for facilitating removing electromagnet assemblies include: thumb screws used to connect the electromagnet to the cylindrical part of engine compartment, cylindrical portions of engine compartment and electromagnet connected by complementary screw-threading, an engine compartment that has a mounting track that can include such features as a mounting rail and mounting apertures, an electromagnet with complimentary features to facilitate mounting the electromagnet on engine compartment, and an electromagnet or engine compartment that has hinges and latches for securing the electromagnet to the engine compartment. Other means for facilitating the removal of electromagnets from the clean engine will be readily apparent to those of ordinary skill in the art.

Figure 4:
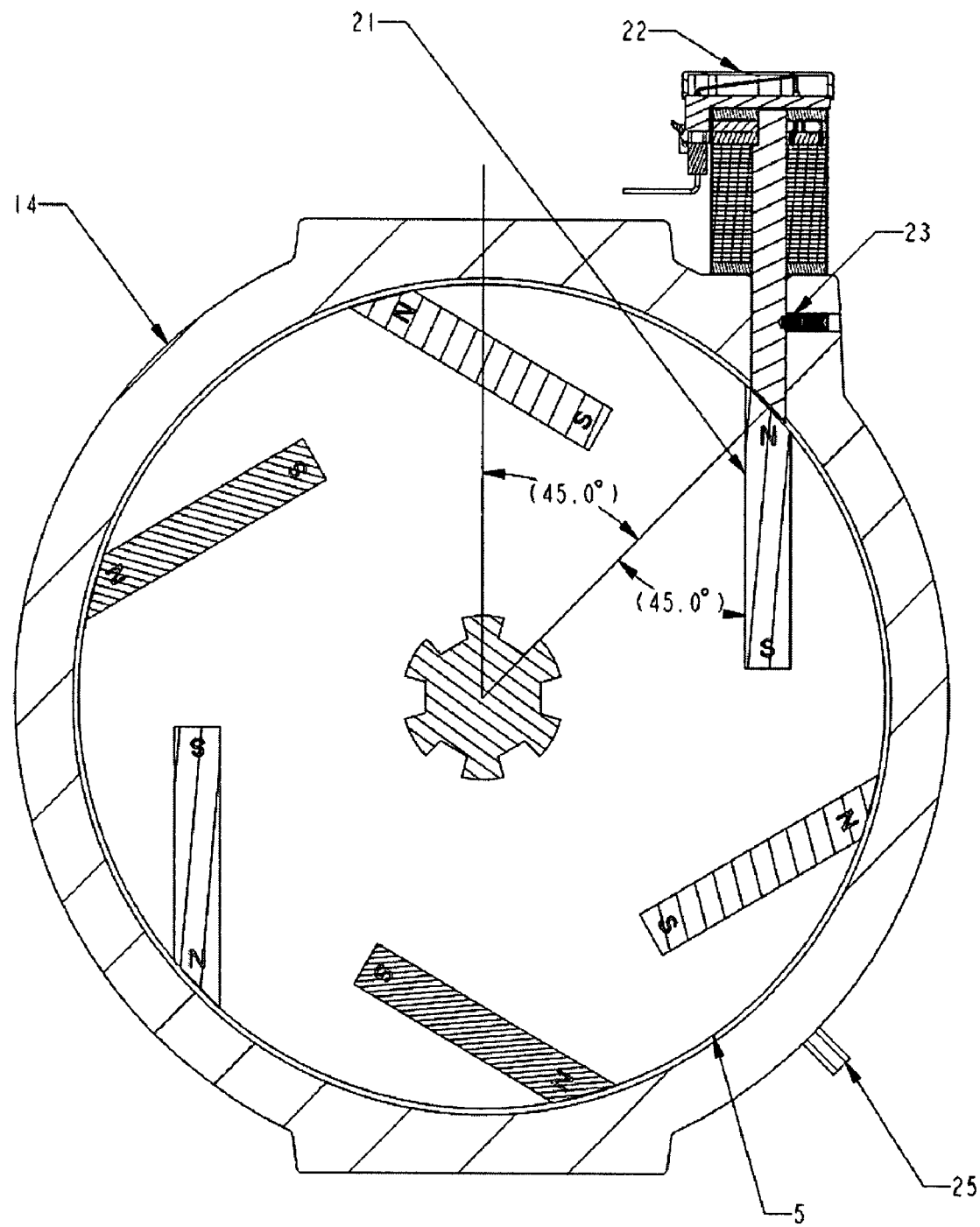
FIG. 4 is a block diagram illustrating a sectional view through B-B of FIG. 3.

Referring to FIG. 4, a sectional view through B-B of FIG. 3 is shown. The electromagnet assembly 22 is charged by batteries. As shown, the north pole of electromagnet assembly 22 opposes the north poles of permanent magnets 21. In another embodiment of the invention, the south pole of the electromagnet assembly opposes the south poles of the permanent magnets.

An electrical circuit trigger device senses the passing of the permanent magnet 21 relative to electromagnet assembly 22 such that the electromagnet fires at the optimal moment to deliver the maximum opposing force. In one exemplary embodiment of the invention, each magnet wheel has 6 permanent magnets arranged in a 6×60 degree circular pattern. A set screw 23 can be used to lock the electromagnet assembly 22 into a locked position in housing 14. A vent or check valve 25 allows release of any potential build up of pressure inside the clean engine.

In one embodiment of the invention, the electrical trigger device circuit designed to detect the passing of the permanent magnets contains a metal-oxide-semiconductor field-effect transistor (MOSFET).

In another embodiment of the invention, there is a second set of electrical trigger device circuits for each electromagnet that is designed to fire in a bipolar manner. In such an embodiment of the invention, the bipolar second electrical circuit selectively acts to slow or brake the rotation of the wheel assemblies. Such an invention could also include a switch to disengage the first electrical circuit while engaging the second electrical circuit.

Figure 5:
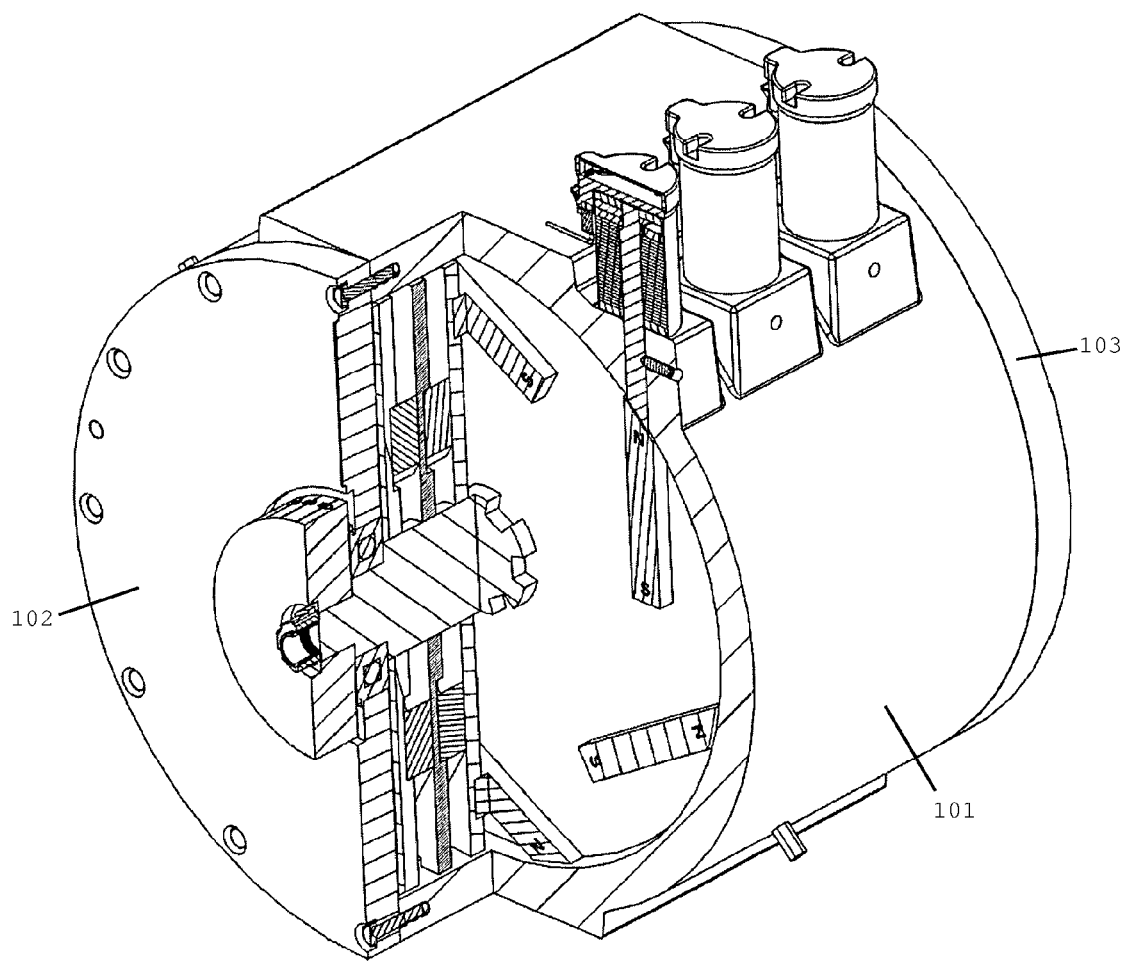
FIG. 5 is a block diagram illustrating an isometric view of a clean engine showing a cutaway in order to see internal features of the engine.

FIG. 5 is an isometric view of a clean engine showing internal features.

Figure 6:
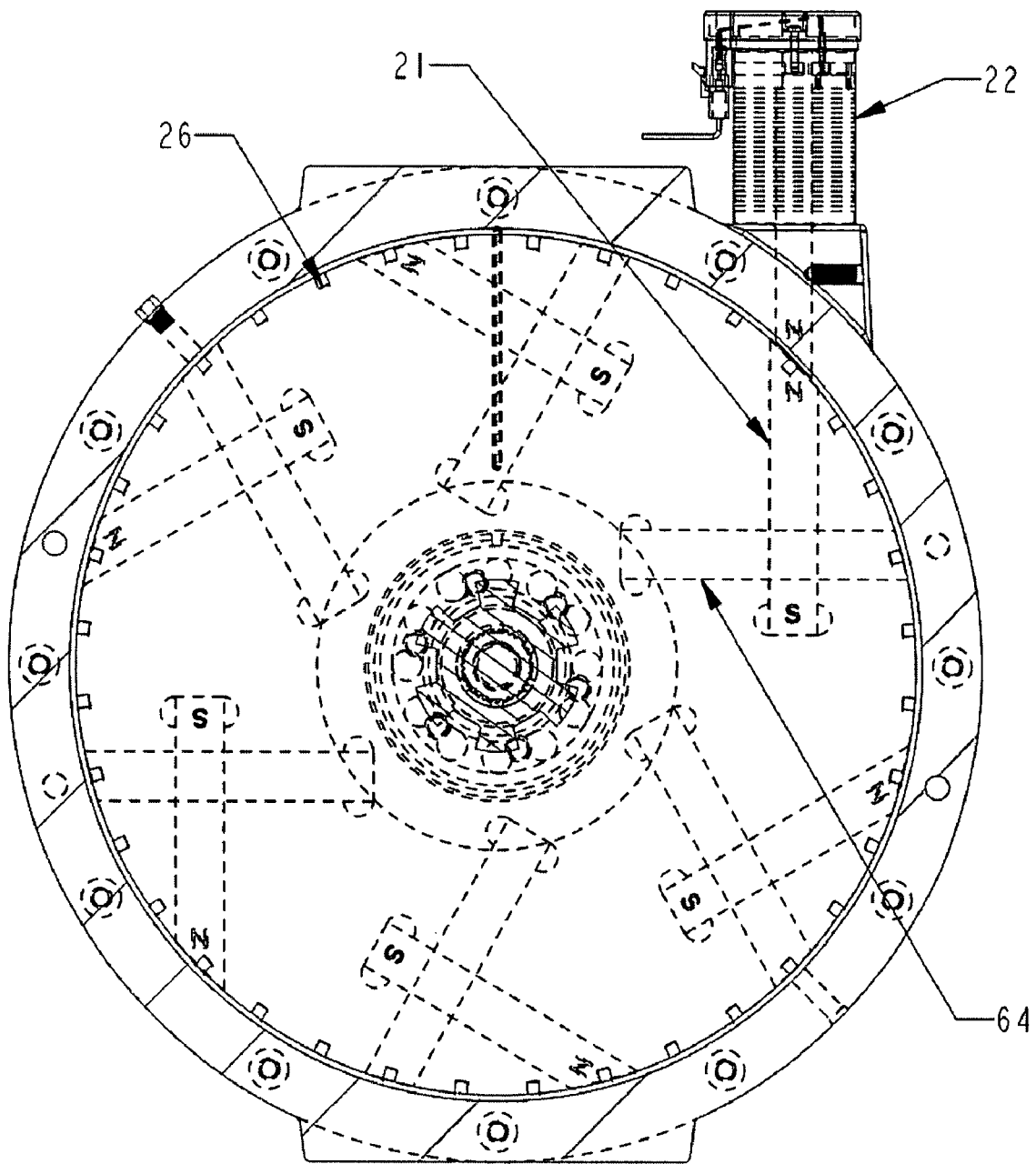
FIG. 6 is a block diagram illustrating a sectional view along C-C of FIG. 2.
Figure 7:
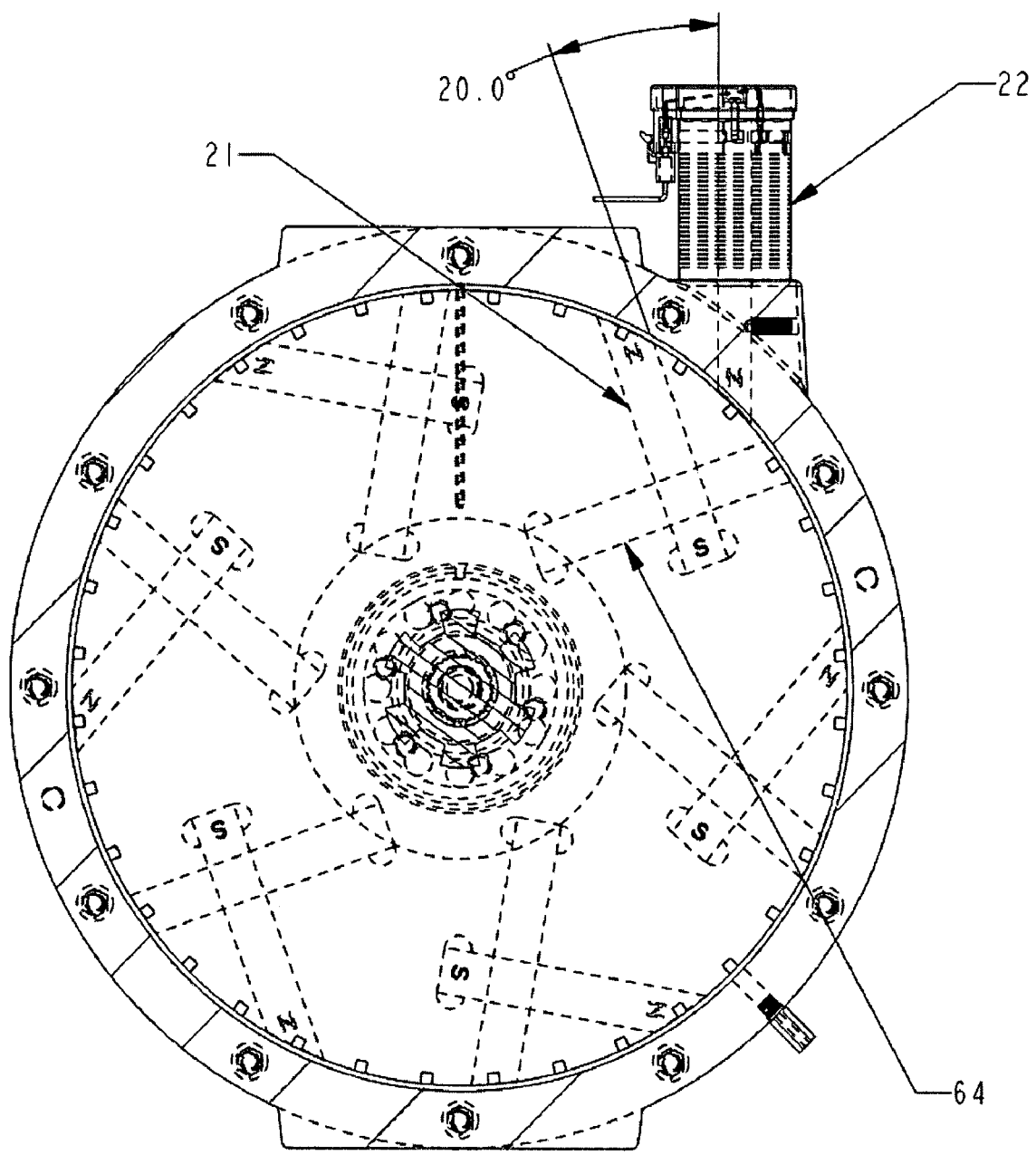
FIG. 7 is a block diagram illustrating a sectional view along D-D of FIG. 2.
Figure 8:
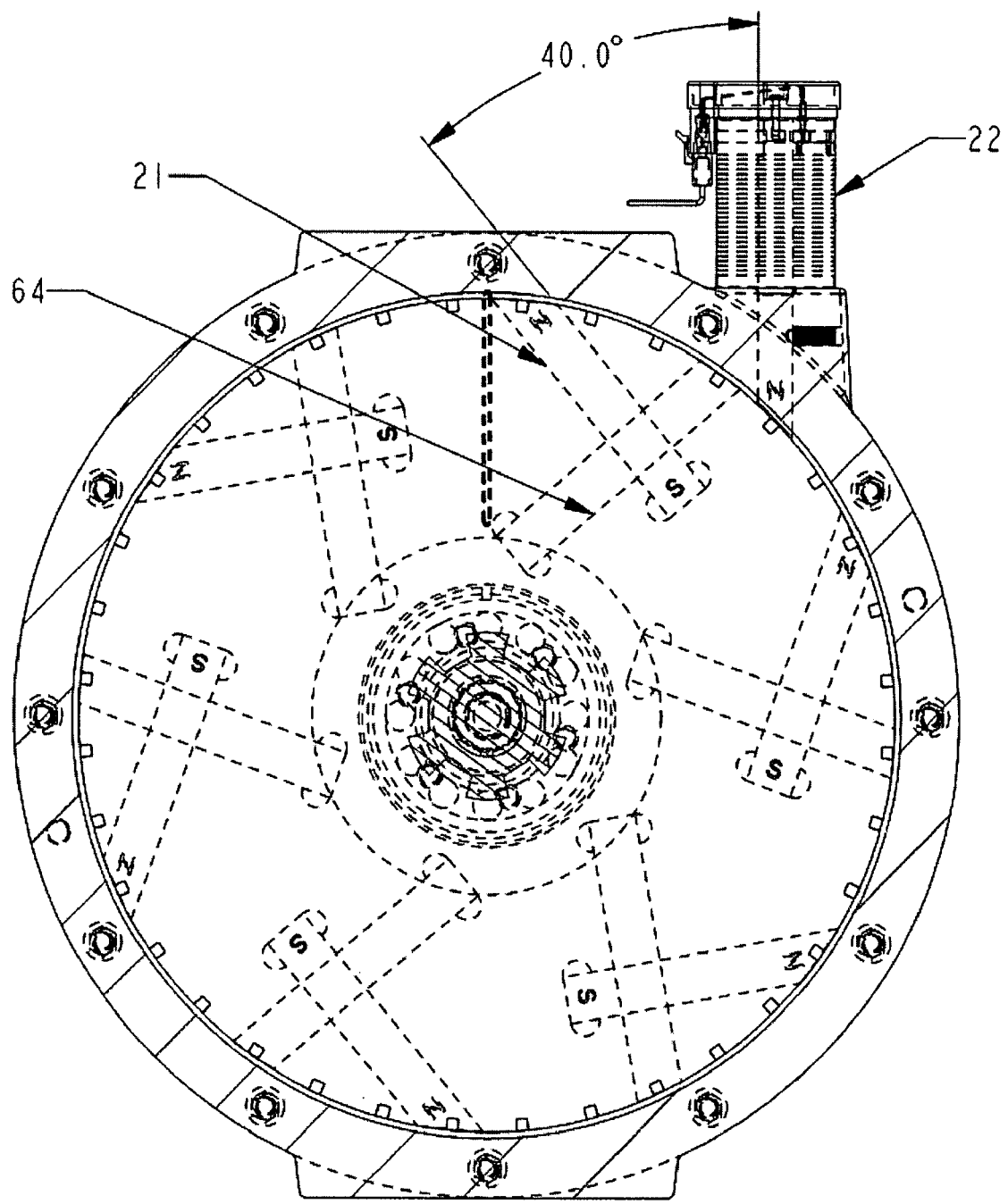
FIG. 8 is a block diagram illustrating a sectional view along E-E of FIG. 2.

FIG. 6 is a sectional view along C-C of FIG. 2 showing wheels 2-4. FIG. 7 is a sectional view along D-D of FIG. 2 showing wheel 5-7. FIG. 8 is a sectional view along E-E of FIG. 2 showing wheels 9-10.

FIGS. 6-8 all show a different section of a clean engine with various rotor element rotations. Magnet wheel assembly 4 is shown with one of its permanent magnets in line with the axis of the electromagnet assembly 22 per FIG. 6. At this same point in time, the magnets of magnet wheel assembly 7 are 20 degrees out of phase with those in magnet wheel assembly 4 per FIG. 7. Also, at this same point in time, the magnets of magnet wheel assembly 10 are 40 degrees out of phase with those in magnet wheel assembly 4 per FIG. 8. Thus only one of the three electromagnet assemblies 22 in the row shown will be firing at any given moment in time. This arrangement also aids in assembly as the locking wheels 1 and/or 13 can be used to control the rotational position of the rotor element of a clean engine such that the electromagnet assemblies 22 can be installed or removed with relatively little force.

In one exemplary embodiment of the invention, the electromagnet assemblies include a component for opening up the casing and removing the electromagnet. Such a component could include a latch and hinge on the electromagnet casing. The electromagnet casing could have screw threading so that an electromagnet casing top with complimentary threading can be screwed onto the electromagnet casing. The casing of the electromagnet can also be removable from the main housing of a clean engine. Other ways of designing the electromagnet and housing will be readily apparent to those of reasonable skill in the art.

In another embodiment, the main housing of a clean engine, a handle and/or a plurality of latches devices which allows for accessing the wheel assemblies without disassembling the main housing.

Figure 9:
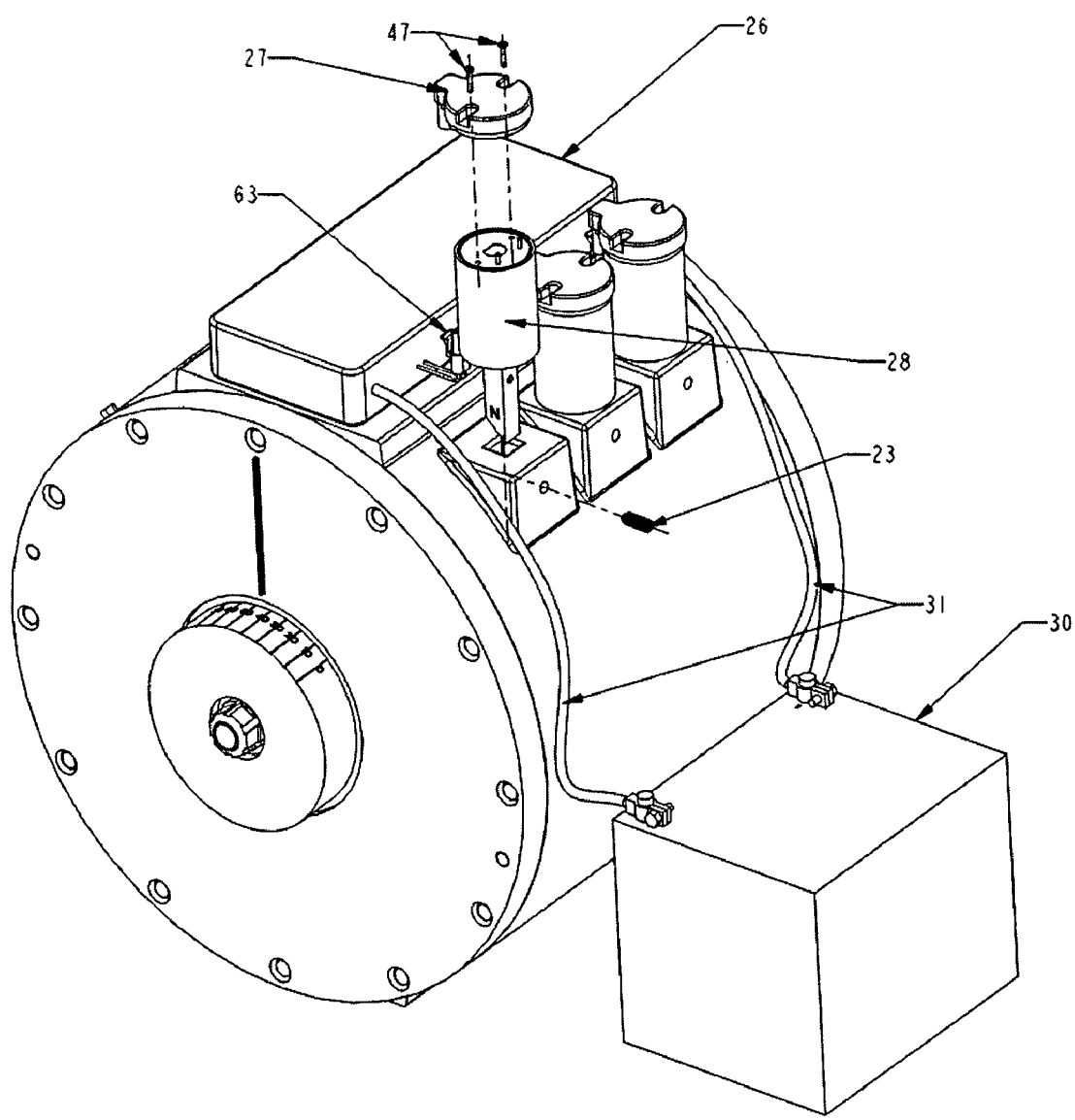
FIG. 9 is a block diagram illustrating an isometric view of a clean engine including a power source and a control box.

Referring to FIG. 9, a layout of a clean engine is shown that includes a power supply 30, power cables 70, and a control and electronics enclosure 26. Some of the features that facilitate removal of the electromagnet are also illustrated. The entire electromagnet assembly 22 can be released from the engine housing by removal of a single set screw 23 and uncoupling of a wire harness 63. The electromagnet assembly can further be separated into two halves, top 27, and bottom 28 by removal of two machine screws 47.

Figure 10:
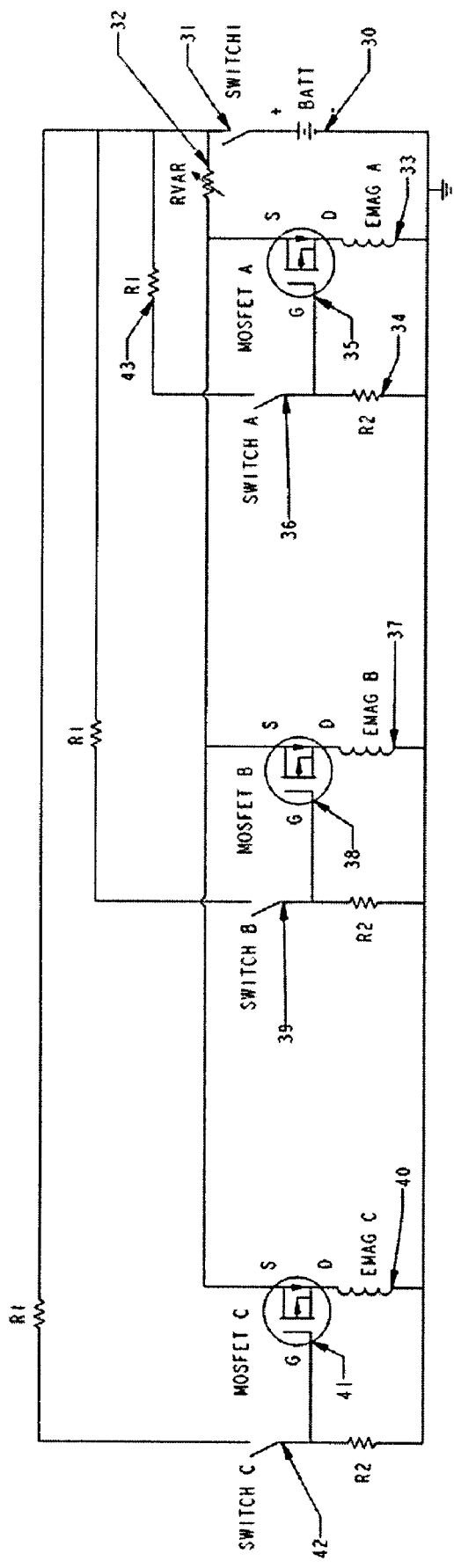
FIG. 10 is a schematic illustrating one possible circuit for powering an electromagnet assembly.

FIG. 10 shows one potential circuit schematic for powering the electromagnet. Power is supplied by a power supply 30. The actual number of batteries will vary depending on total power required. Batteries may be hooked together in series to increase system voltage, and/or parallel to increase total amp-hours available to the clean engine. SWITCH1 31 is a switch that regulates the flow of electricity from the battery, turns the clean engine on or off and would be similar to turning the ignition on in an automobile. Types of switches that can be utilized in the clean engine include wafer switches, DIP switches, surface mount switches, reed switches, miniature toggle switches, in-line switches, push-button switches, rocker switches, and microswitches.

RVAR 32 is a potentiometer that would supply variable voltage to the clean engine and would function similarly to a gas peddle on an automobile. R1 43 and R2 34, are resistors that provide a fractional voltage to the gate of MOSFETA 35 when SWITCHA 36 is closed. MOSFETA 35 is a metal-oxide-semiconductor field-effect transistor. MOSFETA 35 may be a negative-positive-negative, positive-negative-positive, and/or bipolar metal-oxide-semiconductor field-effect transistor. Other means for adjusting variably adjusting electrical current flow rate include utilizing resistors, potentiometers, capacitors, rectifiers, transformers, and electrical condensers. Other means for variably adjusting electrical current flow rate will be readily apparent to those of ordinary skill in the art.

When the proper gate voltage is applied, the voltage at the MOSFET source drives current through EMAGA 33 which is one of three electromagnets shown in this particular circuit. In one exemplary embodiment of the invention, an EMAGA 33 is an electromagnetic has a holding force of 44 pounds and a duty rating of 5 watts, such as the EM137 from A.W.P. Co., Inc.

SWITCHA 36 is a switch trigger device which can be controlled by another electronic circuit that would contain a device to sense the position of the permanent magnets aligned with EMAGA 33. The position would be read by a microprocessor that would close SWITCHA 36 at the right moment to fire EMAGA 33 such that it pushes on the permanent magnet creating torque. This leg of the circuit gets repeated for each electromagnet used in the clean engine (3 in this example).

Figure 11:
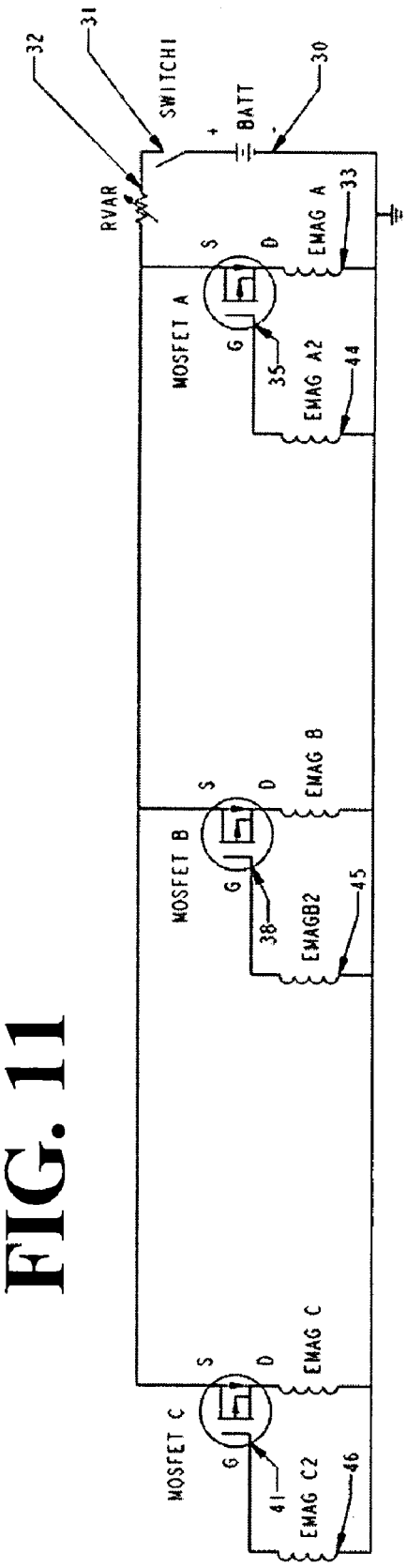
FIG. 11 is a schematic illustrating another possible circuit for powering an electromagnet assembly.

FIG. 11 illustrates another exemplary embodiment of a circuit schematic for powering an electromagnet. In this diagram, the gate voltage is supplied to an electromagnet EMAGA2 44. The voltage is generated in EMAGA2 44 by the passing of the permanent magnet. In one embodiment of the invention, EMAGA2 44 is a secondary winding in electromagnet assembly 22, while in another embodiment of the invention EMAGA2 44 is a separate electromagnet mounted in the control box 26.

In another embodiment of the invention, the electromagnet assembly 22 includes an electrical circuit that includes a variable resistor in parallel with the electromagnet windings and another resistor in series with the windings of the electromagnet. By changing the resistances of the circuits, the electrical current flowing through the electromagnet, as well as the strength of the electromagnet, can be selectively varied. The maximum force of the electromagnet is given to be:

$$F = \frac{\mu N^2 I^2 A}{2L^2}$$

Where N is the number of turns of wire around the electromagnet, I is the current in amperes, L is the length of the magnetic circuit A is the area of the pole faces in square meters, and μ is the permeability of the electromagnet. Thus, by varying the resistance of the electrical circuit, the strength of the electromagnet, and hence the engine torque can be modified.

Figure 12:
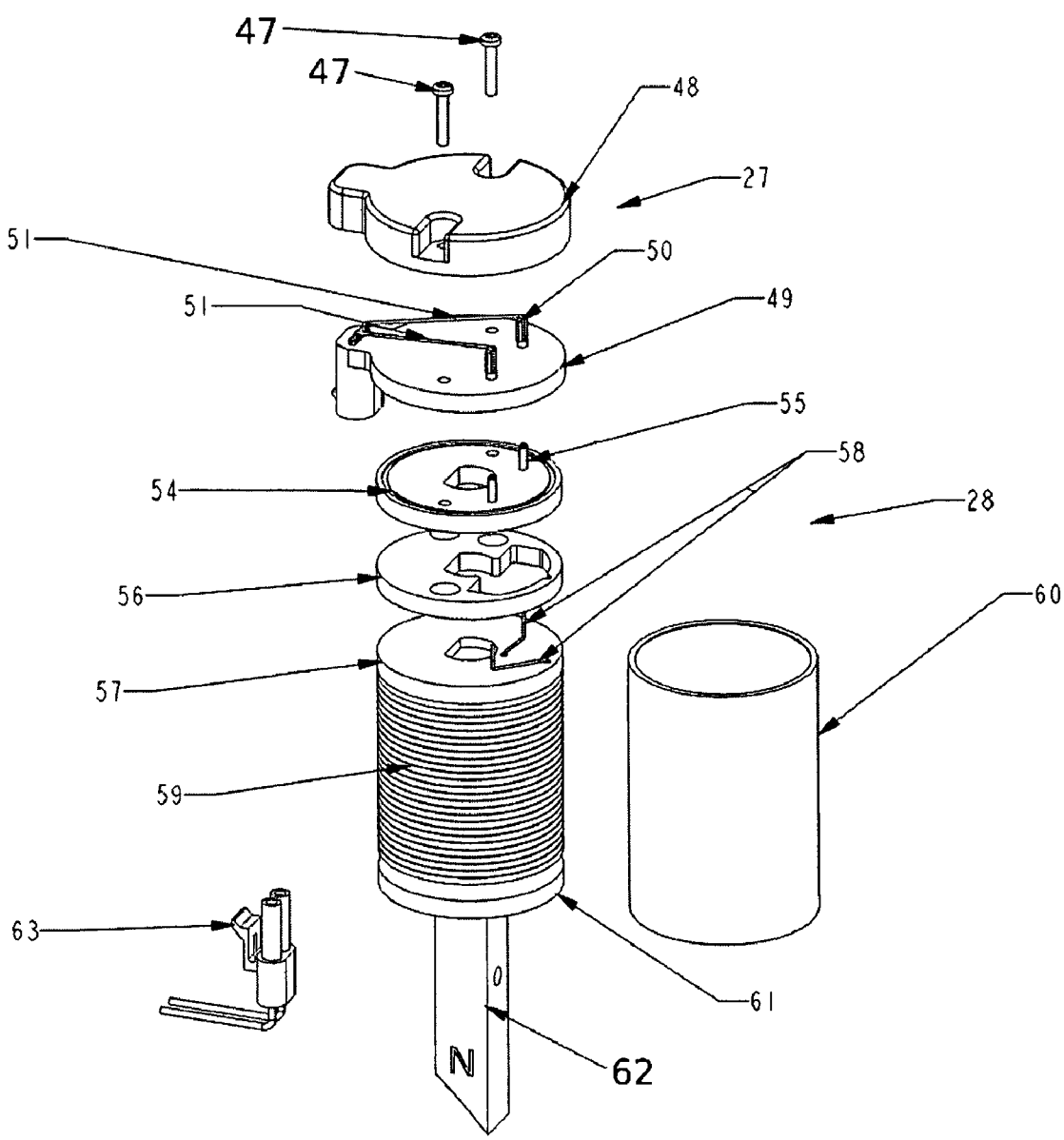
FIG. 12 is a block diagram illustrating an exploded view of an electromagnet assembly.

FIG. 12 shows an exploded view of an electromagnet assembly 22, which comprises a top subassembly 27 and a bottom subassembly 28, held together by machine screws 47. The top subassembly 27 comprises a top cap 48 and a top wire base 49. The top wire base would include at least two top wires 51 and four top connectors 50. One of the top wires 51 would be connected to the drain wire of a MOSFET, while the other is connected to electrical ground. The top wire base 49 also includes a connection means to a wire harness 63. The bottom subassembly 28 comprises a main electromagnet core 62 and electromagnetic winding 59. The bottom subassembly 28 further comprises a bottom washer 61 below the electromagnetic winding 59, and a top washer 57 above the electromagnetic winding 59. The top washer 62 includes holes for locating the two electromagnet leads 58 for electromagnet winding 59. A lead washer 56 provides an opening for the electromagnet leads 58 to connect to the bottom subassembly connectors 55 in assembly connector washer 54. The bottom subassembly connectors 55 in the assembly connector washer 54 mate with two of the top connectors 50 in the top wire base 49. The assembly connector washer 54, lead washer 56, top washer 57, electromagnet winding 59, and bottom washer can be enclosed by a sleeve 60.

Figure 13:
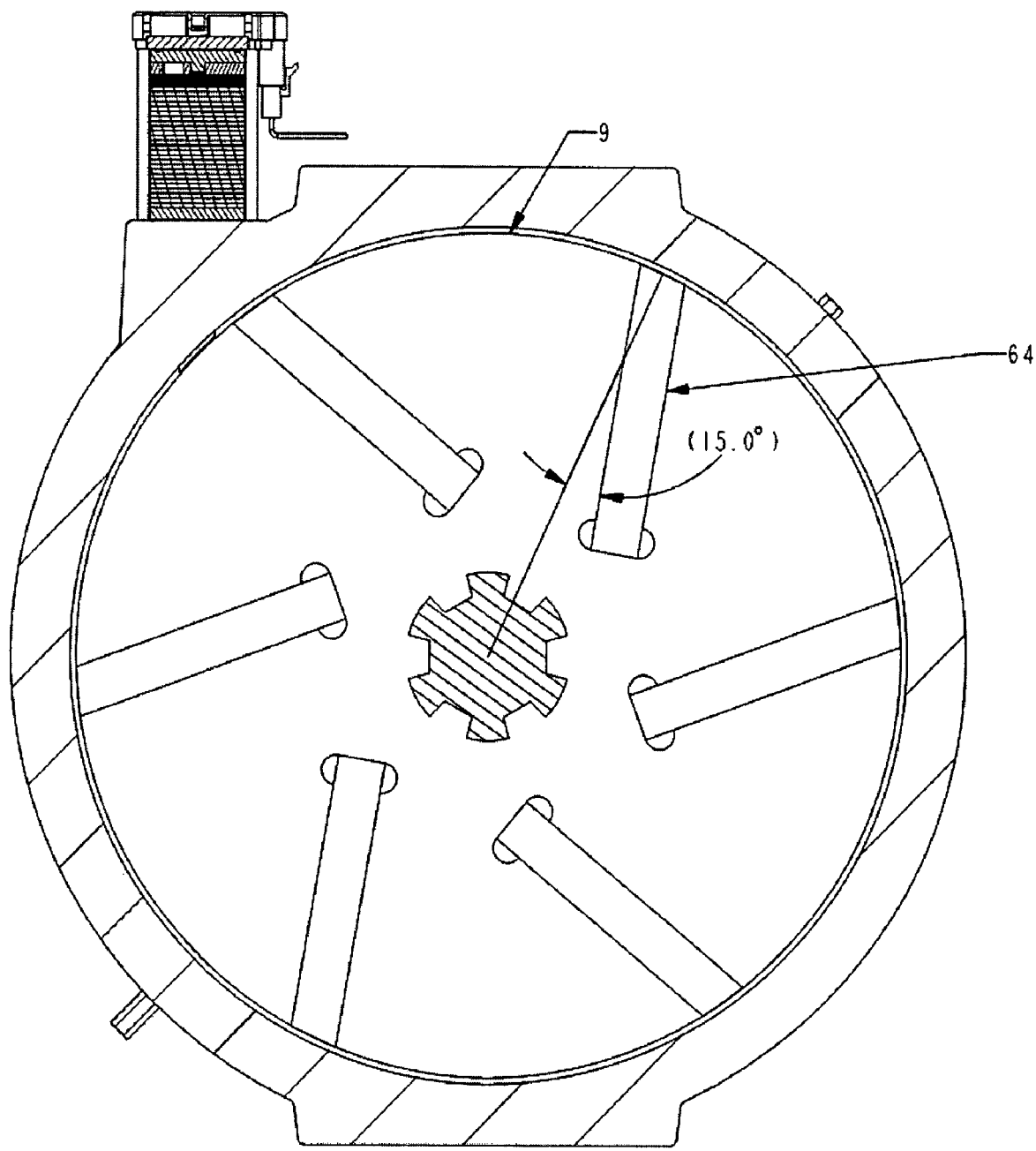
FIG. 13 is a block diagram illustrating a sectional view of the engine at a non-magnet wheel assembly.

FIG. 13 shows a section of a clean engine at nonmagnetic wheel assembly 9 and support vanes 64. The support vanes create a space between nonmagnetic wheels and may be similar in shape to the permanent magnets, though they are rotated at a 90 degree angle to their adjacent magnets. The 90 degree angle supports the magnet-wheels in the areas of highest mechanical stress. In another embodiment of the invention, the nonmagnetic support wheels include a means for regulating airflow within the engine compartment. Examples of means for regulating airflow include: angled fan blades on the nonmagnetic wheel assembly, curved fan blades on the nonmagnetic wheel assembly, and grooves on the nonmagnetic wheel assembly. Other means for regulating airflow will be readily apparent to those of ordinary skill in the art.

FIGS. 14A, B, and C show a front, side, and top view, respectively of a clean engine layout 65 that includes 6 electromagnet assemblies instead of 3. In one embodiment of the invention, there are equal numbers of permanent magnets and electromagnets.

FIGS. 15 A and B show the side and top view of a clean engine used in an automobile. The clean engine is mounted in line with the drive shaft in the front half 65 of the vehicle. The clean engine is not limited to automobiles, and other embodiments of the invention may be used in airplanes, ships, trucks, trains, or other vehicles.

FIGS. 16 A and B show the side and top view of another embodiment of a clean engine in an automobile. The clean engine is mounted transaxially in the front half of the vehicle, near the rear of the vehicle, or transaxially in the rear half of the vehicle. The clean engine can be mounted in any typical location a standard engine could be mounted.

Figure 17:
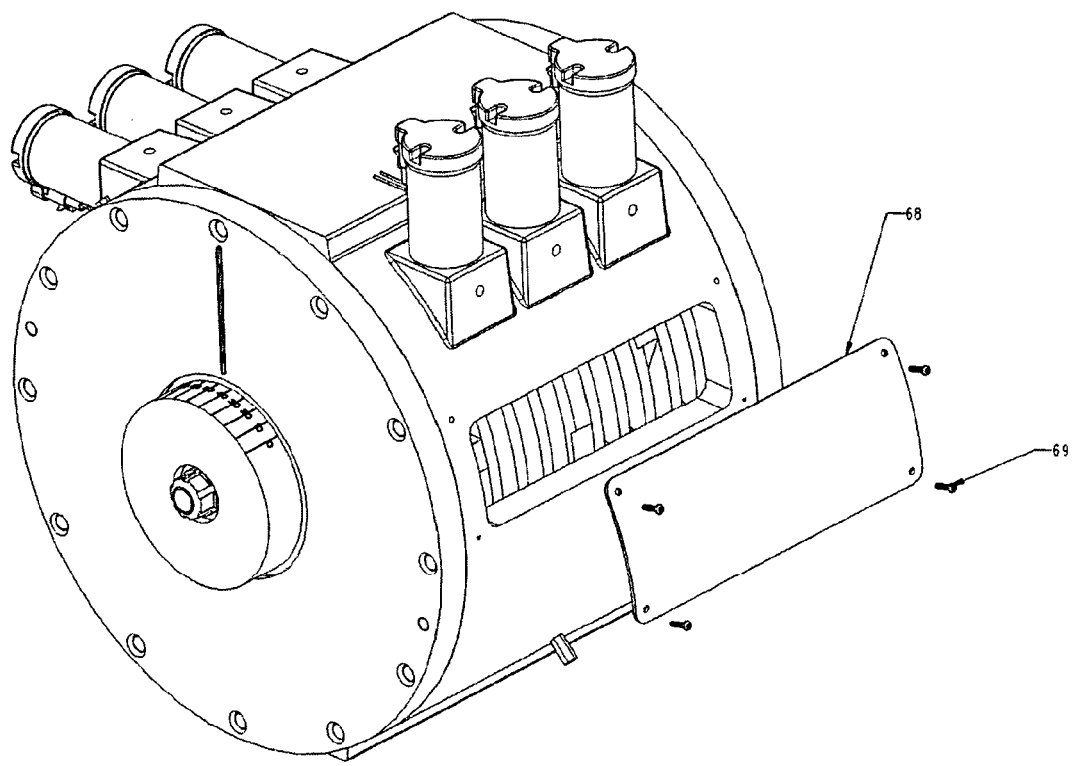
FIG. 17 is a block diagram of a clean engine that includes an access panel.

FIG. 17 shows a version of a clean engine with an access panel 68 connected to the clean engine by a plurality of connection means 69. The access panel can be utilized for inspection and/or maintenance of internal components of the clean engine.

Figure 18A:
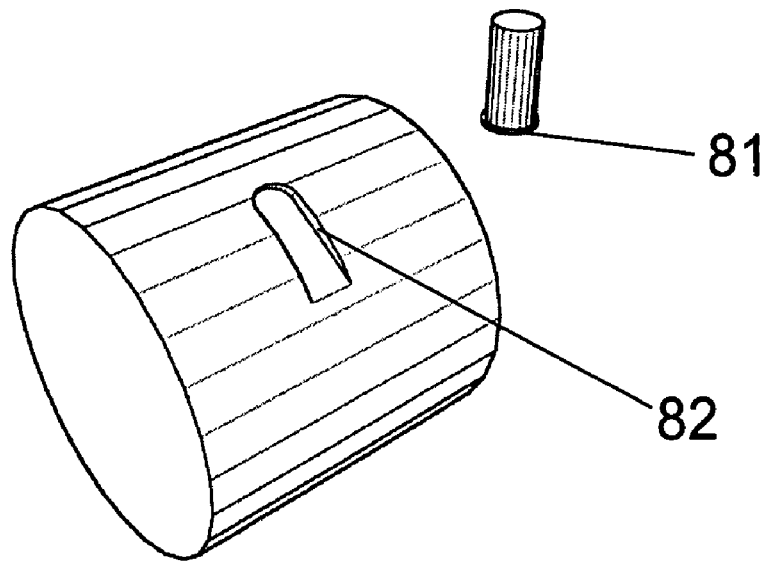
FIG. 18A is a block diagram of a clean engine that includes a cylinder section with mounting track and an electromagnet with complimentary features.
Figure 18B:
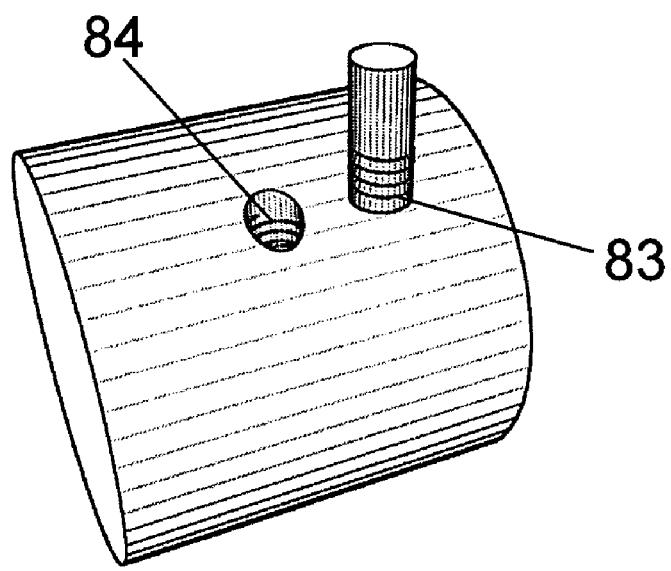
FIG. 18B is a block diagram of a clean engine that includes an electromagnet with screw-threading, and a cylinder section with complimentary threading.

FIGS. 18A and 18B illustrate two embodiments of the invention where the electromagnet and main housing of the engine have complimentary features for facilitating replacement of the electromagnet. FIG. 18A shows an electromagnet with attachment features 81 that are complimentary with a mounting track 82 on the main engine housing. FIG. 18B shows an electromagnet with screw-threading 83, and a main engine housing with complimentary threading 84.

Figure 19A:
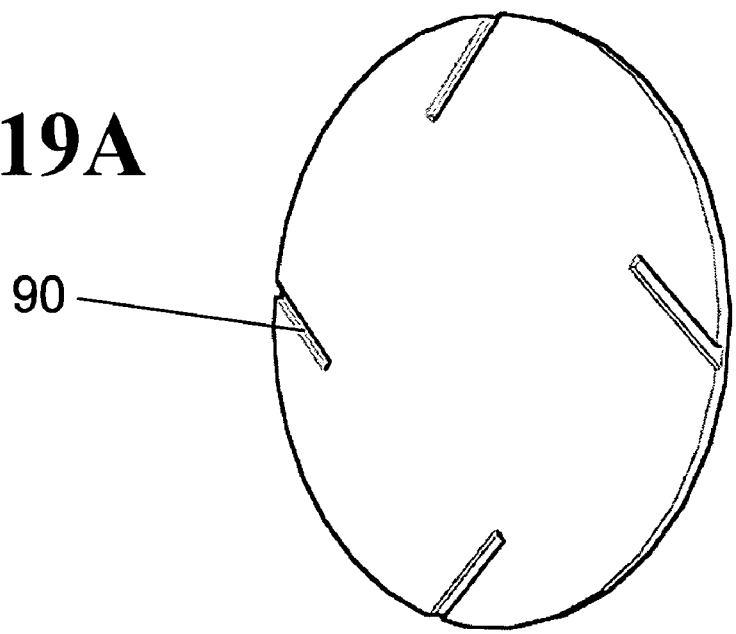
FIG. 19A is a block diagram of a support wheel with a plurality of grooves.
Figure 19B:
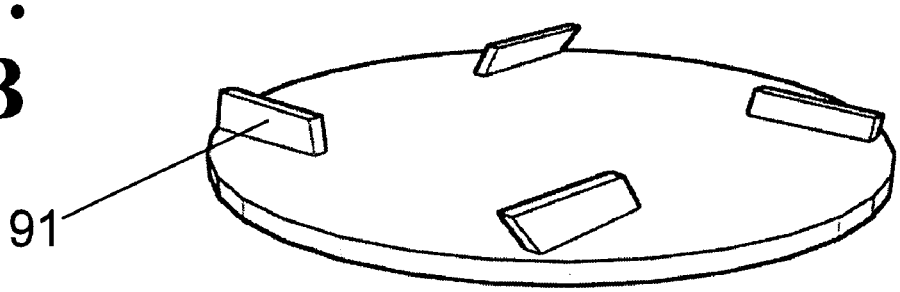
FIG. 19B is a block diagram of a support wheel with a plurality of angled blades.
Figure 19C:
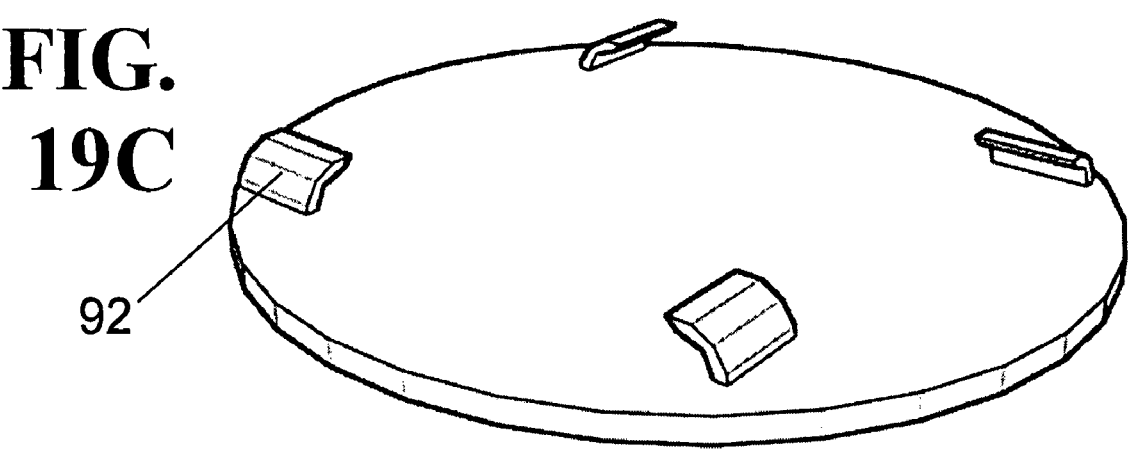
FIG. 19C is a block diagram of a support wheel with a plurality of curved blades.

FIGS. 19A, 19B, and 19C illustrate three embodiments of the invention the support wheels of the rotor element include features for controlling air flow within the engine compartment. FIG. 19A illustrates a support wheel with a plurality of grooves 90. FIG. 19B illustrates a support wheel with a plurality of angled blades 91, and FIG. 19C illustrates a support wheel with a plurality of curved blades 92.

It should be understood that the materials and components described herein are not related or limited to any particular type materials and components unless indicated otherwise. Various other types of materials and components may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, more or fewer elements may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended.

Therefore, all embodiments that come within the scope and spirit of the following claims and equivalents thereto are claimed as the invention.

I claim:

1. A clean engine with a stator element and a rotating element,
wherein, the rotating element comprises:
    a shaft having an axis of rotation;
    a magnet wheel assembly circumferentially disposed about the shaft,
    wherein the magnet wheel assembly includes
        a disc connected to the shaft,
        a plurality of permanent magnets attached to and non-radially oriented on the disc,
wherein, the stator element comprises:
    a compartment that includes
        a cylinder section, a first end unit and a second end unit attached to the cylinder section, the rotating element connected to the first end unit and the second end unit;
    an energy source; and
    an electromagnetic system that includes:
        an electromagnet connected to the compartment, located to establish a small substantially constant gap between the electromagnet and the disc,
        a trigger connected to the energy source and the electromagnet,
        the trigger operable to modulate an energy flow from the energy source to the electromagnet;
    the trigger of the electromagnetic system includes a metal oxide field effect transistor (MOSFET);
    the trigger is operated by a voltage induced in the electromagnet by a rotating permanent magnet;
    the electromagnetic system further comprises a means for facilitating removal of the electromagnet from the cylinder section of the compartment;
    the electromagnetic system further comprises a means for variably adjusting the electrical current flow rate from the source of electric current to the electromagnet;
    the rotating element includes at least three magnet wheel assemblies, and at least eight support wheels;
    the stator element includes at least three electromagnetic systems;

at least one of the support wheels circumferentially disposed about and connected to the shaft; the at least one support wheel includes a means for regulating airflow within the compartment;

the first end unit and second end unit each include a sealed-type bearing, the sealed-type bearings connected to the rotating element;

the permanent magnets of the magnet wheel assembly are magnetically oriented at 40 degrees to 50 degrees relative to a radius of the disc; and the magnet wheel assembly comprises six permanent magnets equally spaced and connected to the periphery of a circumference of the rotor.

2. The clean engine of claim 1, wherein
the cylinder section includes a screw-threaded opening, and
the electromagnetic system further comprises screw-threading complimentary to the screw-threaded opening of the cylinder section.

3. The clean engine of claim 1, wherein
the electromagnetic system further comprises a hinge and a latch.

4. The clean engine of claim 1, wherein
at least one of the support wheels includes a plurality of grooves regulating airflow within the compartment.

5. The clean engine of claim 1, further comprising
an angled fan blade connected to the at least one of the support wheels for regulating airflow within the compartment.

6. The clean engine of claim 1, wherein
the rotating element rotates within the stator element.

7. The clean engine of claim 1 wherein
the clean engine is connected to a vehicle.

8. The clean engine of claim 1 further comprising
an epoxy securing at least one permanent magnet to the disc.

9. The clean engine of claim 1, wherein
each of the plurality of permanent magnets has a pole of a first polarity, and each of the poles is attached to the outer circumference of the disc.

10. The clean engine of claim 1, wherein
at least one of the permanent magnets is an Alnico magnet.

11. The clean engine of claim 1, wherein
at least one of the permanent magnets is a Neodymium magnet.

12. The clean engine of claim 1, wherein
the compartment includes an access panel.

13. The clean engine of claim 1 wherein
the compartment includes a mounting track.

14. The clean engine of claim 1 wherein
the compartment includes a mounting track, and the electromagnet connects to the compartment at the mounting track.

15. The clean engine of claim 1 wherein
the compartment includes a mounting track, and
at least one of the permanent magnets is a Neodymium magnet.

16. The clean engine of claim 15, wherein
the compartment includes an access panel.

17. The clean engine of claim 1, further comprising
a curved fan blade connected to at least one of the support wheels for regulating airflow within the compartment.

* * * * *